United States Patent

[11] 3,572,500

[72] Inventor Anastasios P. Kouloheris
 Atlanta, Ga.
[21] Appl. No. 738,022
[22] Filed June 18, 1968
[45] Patented Mar. 30, 1971
[73] Assignee Cities Service Company
 New York, N.Y.

[54] BENEFICIATION OF DIATOMACEOUS EARTH
 14 Claims, 3 Drawing Figs.
[52] U.S. Cl. .................................................. 209/5,
 209/10, 209/12, 134/2, 210/502, 241/16
[51] Int. Cl. ................................................... B03b 1/00,
 B03b 7/00
[50] Field of Search.......................................... 209/5, 2,
 166; 106/(Inquired); 23/110.2; 241/16, 20, 24;
 252/449; 210/502, 500; 241/3, 11, 10, 12, 18;
 134/2

[56] References Cited
 UNITED STATES PATENTS
1,606,281 11/1926 Williams........................ 209/5
1,934,410 11/1933 Cummins...................... 209/2X
2,185,224 1/1940 Ralston .......................... 209/166
2,165,532 7/1939 Binns............................. 23/110.2
2,990,958 7/1961 Greene.......................... 209/166
3,013,981 12/1961 Riede ............................ 252/449
3,282,435 11/1966 Goldberg....................... 210/500
3,301,695 1/1967 Mercade ....................... 23/110.2X
3,375,922 4/1968 Martin........................... 209/5

FOREIGN PATENTS
2,379 1/1912 Great Britain................. 23/110.2

OTHER REFERENCES
I&EC, Vol. 45, No. 2, Feb. 1953, Hull, pgs 259— 266 copy in Sci Lit.

Primary Examiner—Frank W. Lutter
Assistant Examiner—Robert Halper
Attorney—J. Richard Geaman ABSTRACT: Diatomaceous earth can be purified of sand and clay and reduced to a smaller particle size by wet attritioning raw diatomaceous earth to reduce the diatomite particle size, hydraulically classifying the wet attritioned material to remove sand and quartz, dispersing clay and centrifugally classifying to remove said clay. Wet attritioning can be done in the presence of a clay dispersant and centrifugal classification can be done before or after the quartz and sand are removed.

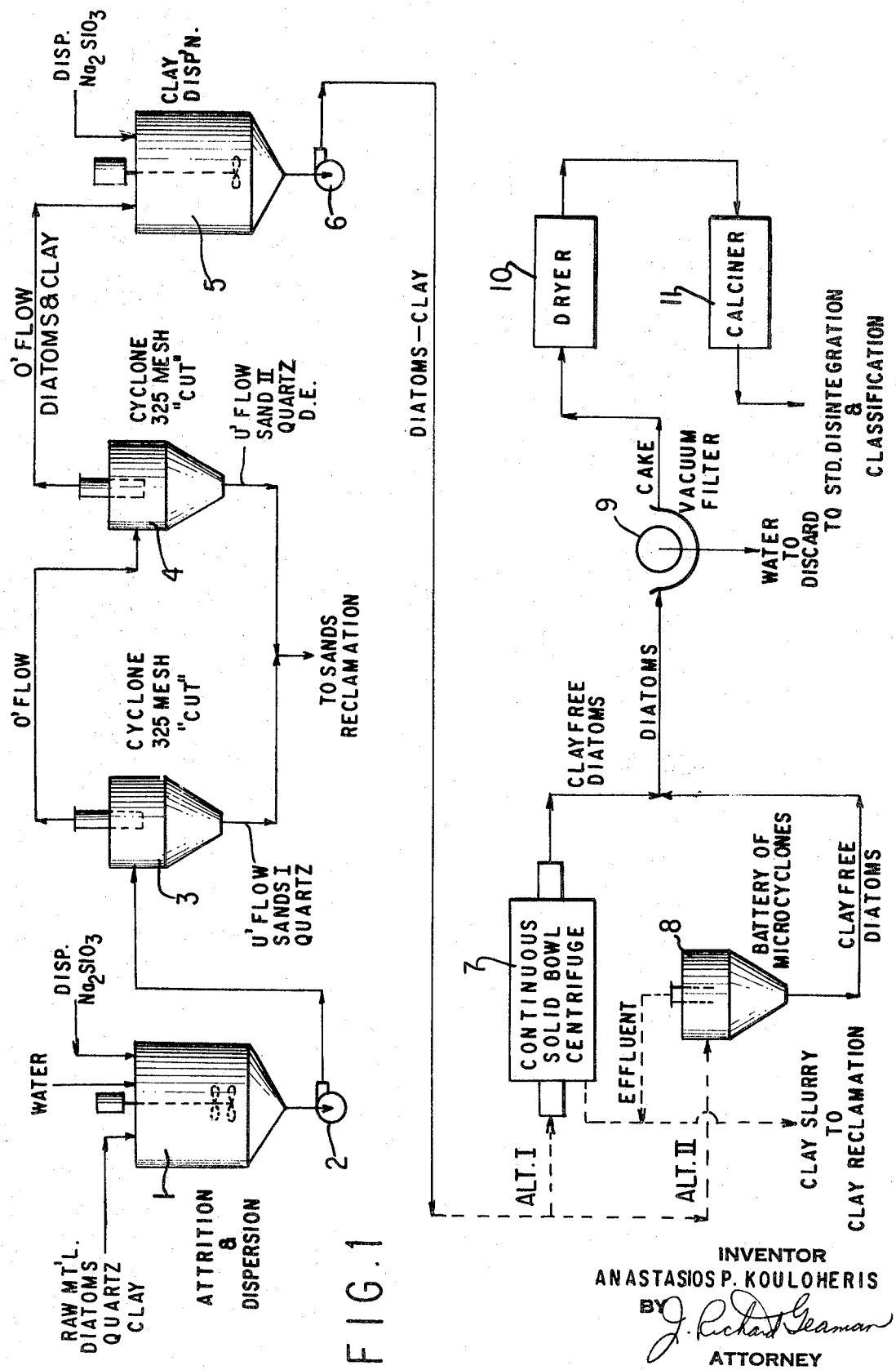

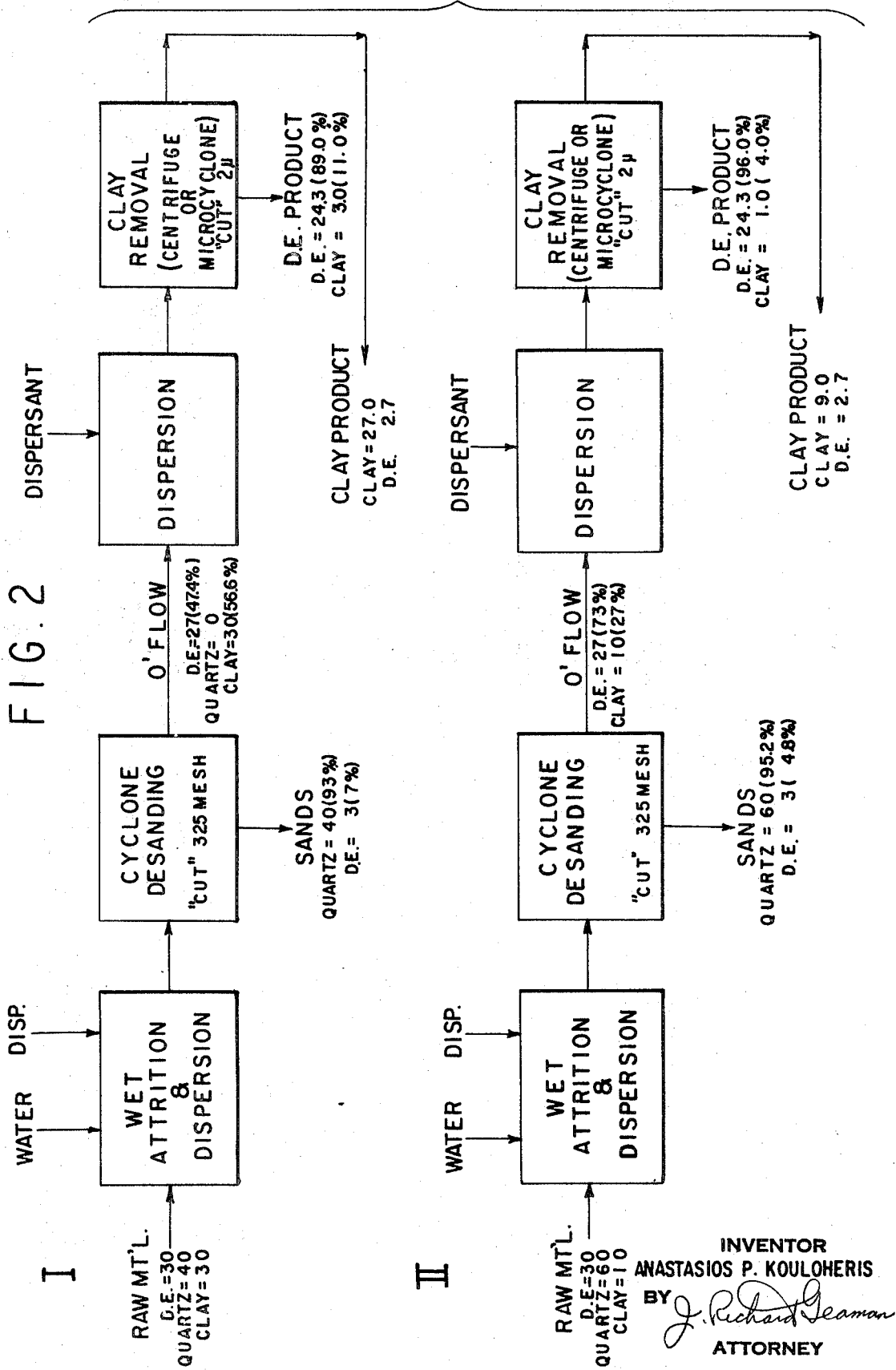

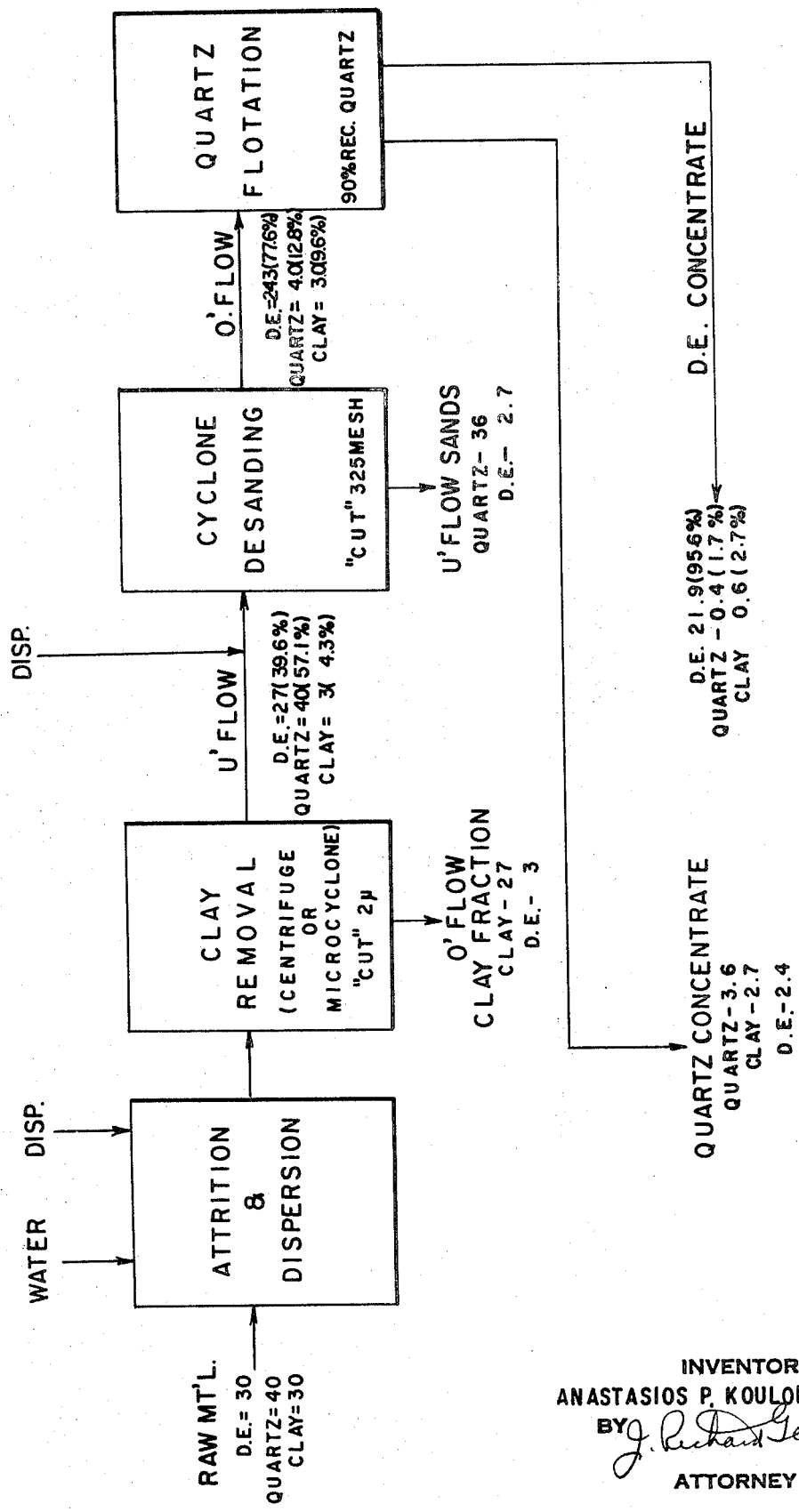

BENEFICIATION OF DIATOMACEOUS EARTH

BACKGROUND OF THE INVENTION

1. Field of the Invention

The present invention relates to the beneficiation of diatomaceous earth deposits. More particularly, it relates to a process for beneficiating low-grade diatomaceous earth material to produce an improved feed for the production of high-grade diatomaceous earth filter-aid products.

2. Description of the Prior Art

Raw diatomaceous earth is a naturally occurring industrial mineral containing diatomites and varying quantities of contaminates such as clay, quartz, organic materials, and the like. The present industry practice has been to selectively mine those diatomaceous earth deposits or portions thereof that contain the so-called high-grade material. This high-grade material normally contains a minimum of about 95 percent diatomite, a clay content of not more than about 3—4 percent, and other impurities not exceeding about 1—2 percent. The large existing quantities of lower grade material are generally rejected or discarded since the conventional technology applicable with respect to high-grade material has not been satisfactory for their treatment.

In the purification of high-grade diatomaceous earth material, a standard pneumatic classification operation is employed to remove the small amount of clay and other impurities from the purified product. This purified product, often containing as much as about 99 percent diatomites, is subjected to calcination to modify the filtration properties of the diatomites. An air separation operation is employed to produce various particle size fractions, or grades, of the purified filter-aid material. Overall recoveries of filter-aid-grade material typically is on the order of 40—60 percent of the diatomites in the raw material. The balance of the diatomaceous earth material, which constitutes a low-grade product, is generally marketed for secondary uses as in insulating and absorbing materials, insecticide carriers, and the like.

The removal of the clay and quartz impurities from the so-called low-grade raw diatomaceous earth material has not been practical heretofore because of the relatively low recovery of diatomites from the low-grade raw material, together with the relatively high cost of processing the raw material. In addition, the recovery of high-grade filter-aid product by the processing of low-grade raw material has been relatively low. The products heretofore obtained by the processing of low-grade deposits have not been useful for filter-aid purposes since these products have generally lacked the necessary combination of flow velocity and clarification characteristics necessary for good filter-aid material.

In deposits containing lower grade materials, the diatomite content will normally vary from only a few percent, e.g. in material called diatomaceous clay or silt, up to a percentage approaching that of high-grade material. The necessity for selectively mining only the high-grade deposits necessarily results in the rejection of large quantities of available raw diatomaceous earth deposits. This circumstance results in a substantial increase in the cost of raw diatomaceous earth material. In addition, the overall cost of filter-aid material is increased by the necessity of shipping diatomaceous earth material from regions in which high-grade raw material may be selectively mined to those areas, sometimes considerably distant therefrom, in which the filter-aid material is to be employed.

It is an object of this invention, therefore, to provide a process for the beneficiation of raw diatomaceous earth material.

It is another object of the invention to provide a beneficiation process for treatment of low-grade diatomaceous earth deposits.

It is another object of this invention to provide a process for the beneficiation of raw diatomaceous earth material to produce an improved feed for the production of high-grade diatomaceous earth material.

It is a further object of this invention to provide a beneficiation process in which the recovery of diatomites is enhanced.

It is a further object of the present invention to provide a beneficiation process for the treatment of raw diatomaceous earth material having relatively high quantities of clay and quartz.

With these and other objects in mind, the present invention is herein described and illustrated, and the novel features thereof are set forth in the appended claims.

SUMMARY OF THE INVENTION

Low-grade diatomaceous earth deposits are beneficiated by liberating the diatomite, clay and quartz constituents thereof and separating the constituents by specific classification techniques. With low-grade deposits containing appreciable quantities of both sand and quartz, a wet attritioning action is first employed to break down agglomerates of the raw material. The diatomites, quartz and clay are thus liberated from each other. The attritioning action employed is also sufficient to reduce the particle size of coarse diatomite particles to less than about 44 microns. In degree and time of agitation, the wet attritioning action is moderated so as to avoid reducing the diatomite content of the raw material below about 5 microns in particle size. Before separation of the clay from the diatomite is accomplished, the dispersion of the clay constituent into its natural −2 micron environment should be assured. A clay dispersant is mixed with the material being treated for this purpose.

Separation of the clay is accomplished by a centrifugal classification, as in a solid bowl centrifuge or a battery of microcyclones suitable for a 2 micron cut. The quartz constituent of the raw material can be separated from the diatomites by a hydraulic classification operation. For this purpose, a +325 mesh fraction containing the quartz is separated from a −325-mesh fraction, in which contains a large proportion of the diatomite content of the raw material.

The clay dispersant may be added to the raw material during the wet attritioning action to facilitate the dispersion of the clay into its −2 micron environment. If the hydraulic classification for quartz removal precedes the clay removal operation, additional clay dispersant may be added to the clay-diatomite slurry following quartz removal to assure the complete dispersion of the clay in its −2 micron environment. Alternately, all of the clay dispersant may be utilized either in the initial wet attritioning step or in the separate dispersion step following separation of the quartz from the raw material. The total amount of clay dispersant employed is generally within the range of from about 1 to about 14 pounds per ton of solids in the raw diatomaceous earth material being treated. When a clay dispersant is mixed with the raw material both during the initial wet attritioning step and following quartz removal, it is generally desirable to add a major portion, e.g. about 75 percent, of the clay dispersant in the dispersion step following quartz removal.

When a raw diatomaceous earth material containing from about 5 percent to about 10 percent clay is treated, the beneficiated diatomite fraction constitutes an improved feed for the production of high-grade filter-aid material by a conventional calcination operation. If the clay content ranges from about 10 percent to about 40 percent by weight, however, the beneficiated diatomite fraction comprises an improved feed for processes intended for the production of high-grade filter-aid products from low-grade raw diatomaceous earth material. The beneficiated diatomite fraction in this instance is also useful in that it may be sold for secondary diatomaceous earth uses as a filler, insulating material, abrasive, and the like.

When a portion of the quartz is present as silt having a particle size distribution of from about 30 to about 40 microns, a modified process must be employed in order to separate the silt from the diatomite fraction. Techniques such as quartz flotation and elutriation may be employed for this purpose.

Irrespective of the particular embodiment employed, the beneficiated diatomite fraction suitable for calcination may, in accordance with conventional practice, be passed through a dryer prior to the calcination operation. To reduce the necessary drying capacity, the beneficiated diatomite fraction may be concentrated prior to drying. This concentration may be accomplished by filtering, as in a vacuum filter. The resulting filter cake to be fed to the drying operation would thus have a lower water content, as for example on the order of 30—35 percent by weight as opposed to a water content of 50 percent or more in the beneficiated diatomite fraction prior to filtration. In order to reduce the load on the filter, an intermediate slurry thickening operation may be included, with a conventional flocculant added to increase the rate of settling of the solids in the thickener.

DETAILED DESCRIPTION OF THE INVENTION

The present invention, as indicated above, comprises a process for beneficiating low-grade diatomaceous earth material. Such low-grade material generally contains appreciable quantities of clay and quartz. Some low-grade deposits have a diatomite content approaching that of high-grade raw material, i.e. a diatomite content approaching 95 percent by weight of dry solids. In other deposits, the diatomite content may be as low as 30 percent or lower. The clay content of such low-grade material also varies widely, as from about 5—10 percent by weight of dry solids to 30 percent or higher. The remaining solids content of the raw material generally comprises quartz, although small quantities of other minerals and organic matter are usually present.

The process of the present invention involves wet attritioning, clay dispersing and specific separating techniques to remove the clay and the quartz from the diatomite content of the raw material being treated. The wet attritioning operation serves to break down aggregates so as to liberate the diatomite, clay and quartz constituents thereof from each other. The wet attritioning action is also controlled, as to conditions of time and agitation, so as to reduce the particle size of coarse diatomites to less than about 44 microns. The attritioning is not continued for a sufficient time or with a sufficient degree of agitation, however, so as to cause a reduction in the particle size of the diatomite constituents to under about 5 microns. It will be appreciated by those skilled in the art, that various mechanical systems can be employed in the carrying out of the desired wet attritioning action. For example, an attrition tank may be of the standard baffled type furnished with an agitator of two "opposite-pitch" propellers run at a peripheral speed of about 1,000—1,500 feet per minute with an attritioning time of between 10—20 minutes. In a proper sized tank, this agitation will be such as to provide elliptical paths in a vertical plane to assure the proper scrubbing and interparticle rubbing to accomplish the purposes indicated above. The desired operating conditions will, of course, depend upon the particular system employed and can readily be determined by those skilled in the art for the particular apparatus employed.

The hard quartz constituent, which generally has a particle size distribution of from about 40 microns to about 1,000 microns, tends to facilitate the decoating and peeling of the clay constituents from the diatomites. The presence of the hard quartz particles in the slurry of raw material also tends to facilitate the breaking down of coarse diatomite particles, i.e. those having a particle size generally of from over 40 microns to up to 80 microns or higher.

The clay dispersing operation is intended to assure the thorough dispersion of the liberated clay particles into their natural −2 micron environment. Since the clay particles would tend to agglomerate under dry conditions, the dispersing operation is carried out with the material being treated in the form of a slurry in water. In one embodiment, for example, the clay dispersing operation is carried out as a part of the initial wet attritioning action. Any commercially available clay dispersant may be employed in the practice of the present invention. Among the numerous clay dispersants available in the art, the following are illustrative examples of very suitable dispersants: sodium metasilicate with a $SiO_2:Na2O$ ratio of at least 3 (grade "N"), sodium hexa-meta phosphate (commercial grade) such as "Nalco 519," sodium or ammonium salts of lignin sulfonates such as "Orzan A and S," and gum arabic products, such as Stractan. Illustrative of other suitable clay dispersants are the sodium salt of di-octyl-sulfo-succinic acid such as "Aerosol OT," hydrophilic colloid products of polysacharides such as "Kelzan," "Algins," and the like, and derivatives of sulfonated lignin products. The clay dispersants can generally be employed either alone or in combination with other clay dispersants.

While the amount of clay dispersant employed in the practice of the present invention is not critical, the clay dispersant will normally be employed in an amount within the range of from about 1 to about 14 pounds of clay dispersant per ton of raw diatomaceous earth solids being treated. When a strong or particularly effective clay dispersant is employed, the amount of such dispersant may be less than when a relatively weak or less effective clay dispersant is employed. While amounts outside the cited range may be employed, the addition of from about 2 to about 4 pounds of clay dispersant per ton of raw diatomaceous earth material, on a dry basis, may commonly be employed when a relatively strong or effective clay dispersant is employed. More particularly, the amount of such an effective clay dispersant employed may frequently be within the range of from about 2.5 to about 3.0 pounds per ton of raw diatomaceous earth material on a dry basis.

As indicated, the clay dispersant tends to facilitate the thorough dispersion of the colloidal clay particles into their natural −2 micron environment. All of the desired clay dispersant may be added at one stage of the overall process. For example, the clay dispersant may be added to the slurry of raw diatomaceous earth material being treated in the initial wet attritioning operation. Alternately, a separate clay dispersing step may be employed, as for example after the initial wet attritioning operation and the subsequent removal of quartz from the material being treated. It is also within the scope of the present invention to add the clay dispersant at two separate points, as for example by the addition of a portion of the clay dispersant during the initial wet attritioning action with the remainder being added in a separate clay dispersing operation. In this instance, the same clay dispersant may be employed in each stage of different clay dispersants may be employed in each of the separate clay dispersant applications. Since a portion of the clay dispersant added during the wet attritioning operation will undoubtedly be lost in a subsequent quartz removal operation that precedes clay removal, it is often desirable, in such instances, to employ a minor portion of the clay dispersant in the wet attritioning operation and a major portion of the clay dispersant in the following clay dispersing operation. While again the amounts are not critical features of the invention, about 25 percent of the total amount of clay dispersant employed may conveniently be employed during the wet attritioning operation. About 75 percent of the clay dispersant, therefore, would be added in a separate clay dispersing operation following the removal of quartz from the raw diatomaceous earth material being treated.

The raw diatomaceous earth material being treated will generally be maintained in the form of a slurry of diatomaceous earth solids in water during the wet attritioning action and during the separate clay dispersing operation if employed. It will be appreciated by those skilled in the art, that the concentration of solids in the slurry is not a critical feature of the present invention and may be varied over any convenient range. It has been found, however, that a concentration of diatomaceous earth solids in the range of from about 50 percent to about 60 percent by weight may conveniently be employed. While the concentration of solids in the slurry employed during the clay dispersing operation is also not a critical feature of the invention, it has generally been found that a solids content of from about 10 percent to about 20 percent by weight is generally satisfactory.

The quartz and clay constituents of the raw diatomaceous earth material may be separated from the diatomite content thereof in either order. The quartz may conveniently be separated by a hydraulic classification operation designed so as to effect a 325 mesh "cut" For example, a two-stage hydrocyclone system may be employed for the removal of quartz. The geometry and operating pressure of the two cyclones is adjusted so that, in conjunction with the operating capacity of the units, are such that the desired 325 mesh "cut" is obtained. The obtaining of such a "cut" may readily be achieved by those skilled in the art of cyclone classification.

The +325 mesh fraction comprises essentially all of the quartz particles, together with a very small portion of the diatomites, contained in the raw diatomaceous earth material being treated. The particle size distribution of the thus separated quartz particles will generally range from about 44 microns to about 1,000 microns. The −325 mesh fraction generally comprises the clay and diatomite constituents of the raw diatomaceous earth material. At this stage, the diatomite particles will have a particle size distribution generally of from about 5 microns to about 40 microns. Due to the wet attritioning and clay dispersing operations, the clay particles will generally have a particle size of less than about 2.0 microns, as for example from about 0.5 to about 2.0 microns.

Because of the small particle size of the diatomites and more particularly of the clay particles, it is necessary to employ a centrifugal classification technique in order to separate the clay particles from the diatomites. This desired classification can be conveniently carried out in either a continuous solid-bowl centrifuge or in a battery of microcyclones. In either instance, the units are designed for a 2-micron classification cut which can readily be obtained by those skilled in the well-known art of centrifugal fractionation or classification. The −2 micron clay fraction may be discarded or directed to a clay reclamation unit. The +2 micron fraction contains a predominant portion of the diatomite content of the material being treated, together with a small amount of clay. This +2 micron fraction constitutes a beneficiated diatomite fraction having useful diatomaceous earth characteristics. This fraction comprises an improved feed for the production of high-grade diatomaceous earth filter-aid products. The thus beneficiated diatomite fraction may be directed to a vacuum filter for dewatering prior to being directed to a dryer and a conventional calciner. If desired, a disintegration-classification system may be employed in order to grade the product into various desired sizes.

When the clay content of the low-grade raw diatomaceous earth material is within the range of from about 5 to 10 percent by weight, on a dry basis, the beneficiated diatomite fraction, which will contain a high proportion of the diatomites in the material being treated, comprises an improved feed for the production of high-grade diatomaceous earth filter-aid products by conventional calcination techniques. For high clay material, i.e. 10—40 percent by weight, the beneficiated diatomite fraction will also contain a relatively high proportion of the diatomite content of the low-grade raw material being treated. This beneficiated fraction will generally not be of sufficient diatomite concentration, however, for direct use in conventional calcination processes. This beneficiated product has, of course, improved diatomaceous earth characteristics and may be sold or used directly for secondary applications, such as insulating and absorbing materials, insecticide carriers, abrasives, and the like. This beneficiated diatomite fraction may also be employed as an improved feed in processes tended for the production of high-grade diatomaceous earth products from relatively low-grade starting material. One such process is disclosed in the Riede patent, U.S. Pat. No. 3,013,981 issued Dec. 19, 1961. In accordance with the patented process, an improved calcined diatomaceous earth can be prepared by agglomerating finely divided diatomaceous earth particles by mixing the particles, while substantially preserving the structure thereof, and adding atomized droplets of liquid, such as water, to the moving mass of particles. The water is added in a sufficient amount to plasticize the mixture so that the liquid is distributed throughout the mass of earth. The thus treated diatomaceous earth particles are thereafter subjected to calcination.

In those instances in which the raw material being treated has a sand content of less than about 5 percent by weight, the modified embodiment of the present invention may be employed. The initial wet attritioning operation and the hydraulic classification and operation may be omitted. Thus, the raw material, water and clay dispersant may be introduced directly into a clay dispersion tank so that a slurry conveniently having from about 10 to 20 percent by weight solids is obtained. The amount of the particular clay dispersant, and the time of dispersion in order to thoroughly disperse the clay into its natural −2 micron environment will, of course, be dependent upon the particular clay dispersant employed, the clay content of the raw material being treated, and the particular degree of agitation employed. Following the thorough dispersion of the clay, the slurry is centrifugally classified into a +2 micron fraction and a −2 micron fraction as in the embodiments referred to above. The −2 micron fraction will contain the clay particles, while the +2 micron fraction will contain the diatomites, which will have a particle size distribution generally of from about 5 microns to about 60 or 80 microns.

Referring now to the embodiment of the invention illustrated in FIG. 1, the raw diatomaceous earth material containing diatomites (or diatoms), quartz and clay is fed to attritioning and dispersing tank 1 in which it is mixed with water and a suitable clay dispersant, such as $Na_2SiO_3$. In the embodiment shown, tank 1 is furnished with an agitator having two opposite-pitch propellers. Following the wet attritioning action to break down aggregates of the raw material and the dispersing of the clay into its natural −2 micron environment, the slurry is pumped by pump 2 to cyclone 3 in which a 325 mesh "cut" is made. The overflow from cyclone 3 is fed to cyclone 4 where a finishing 325 mesh "cut" is made. The underflow from cyclones 3 and 4 are passed to a sands reclamation operation or are discarded. This underflow comprising the +325 mesh fraction comprises essentially quartz having a particle size distribution of from about 44 microns to about 1,000 microns. A small amount of diatomaceous earth will also generally be found in this +325 mesh fraction. The overflow or −325 mesh fraction contains the clay and diatomite constituents of the raw material, the diatomite particles having a particle size distribution of from about 5 microns to about 40 microns. The hydraulic classification of the raw material in cyclones 3 and 4, therefore, deserve to essentially remove the quartz constituent from the diatomite and clay content of the raw material.

The overflow from cyclone 4 is passed into clay dispersion tank 5 in which the solids slurry is mixed with an additional amount of clay dispersant as hereinabove described. This clay dispersing operation is to assure the essentially complete dispersion of the clay particles throughout the slurry in their natural −2 micron environment. The slurry is pumped from tank 5 by means of pump 6 for transfer to a centrifugal classifying operation in order to separate the clay from the diatomite content of the material being treated. As illustrated, the slurry may be passed, in alternate I, to a continuous solid-bowl centrifuge 7 designed to ensure an effective 2micron "cut." For this purpose, the diameter of the bowl in conjunction with the retention time afforded to the solids is such that the coarse fraction of solids, i.e. the +2 micron fraction, deposits readily onto the walls of the bowl while the fine fraction effluent leaves the unit. This fine fraction effluent comprises the −2 micron fraction comprising the clay constituents of the material being treated. This clay effluent may be passed to a clay reclamation operation or may be discarded.

In alternate II, the slurry from clay dispersing tank 5 is passed through a battery of microcyclones 8 in which the diameter of each unit-cyclone should be small, as for example on the order of 10—40 mm., so that a high classification efficiency can be readily obtained. Again the effluent comprises the −2 micron fraction containing the clay constituents. This effluent may be passed to a clay reclamation operation or may be discarded. The +2 micron fraction comprises diatomites having a particle size of less than about 44 microns but generally more than about 5 microns.

The +2 micron fraction from either continuous solid-bowl centrifuge 7 or the battery of microcyclones 8 comprises a beneficiated diatomite fraction having useful diatomaceous earth characteristics and comprising an improved feed for the production of high-grade diatomaceous earth filter-aid products. This beneficiated diatomite fraction may be concentrated as by means of vacuum filter 9. The filter cake may thereafter be passed through dryer 10 and calciner 11 which comprise a conventional calcination operation. The calcined product may thereafter be subjected to standard disintegration and classification operations well known in the art to produce final products of the desired grades.

FIG. 2 represents a diagrammatic illustration of the application of one embodiment of the present invention to two raw diatomaceous earth materials of a low grade. In each instance, the diatomite content of the low-grade raw diatomaceous earth material is 30 percent by weight. The raw material of illustrative Example I is a high clay material having a clay content of 30 percent by weight and a quartz content of 40 percent. The low-grade raw material of illustrative Example II, on the other hand, has a relatively lower clay content, i.e. 10 percent by weight, and a quartz content of 60 percent. The numerical values for the indicated separations are based upon an assumed efficiency of 90 percent for diatomite and clay removal. As can be seen with reference to Example I, the process of this embodiment comprises an initial wet attritioning and dispersing operation followed by a cyclone desanding operation designed to effect a 325 mesh "cut." The overflow following sand removal is subjected to a second clay dispersion operation followed by clay removal in a centrifuge or microcyclone designed to effect a 2 micron "cut." The beneficiated diatomite fraction, i.e. the +2 micron fraction, contains 89 percent diatomite by weight and 11 percent clay. The diatomite recovery is 80 percent of the diatomite content of the raw material being treated. While the thus beneficiated diatomite fraction does not meet the requirements for high-grade material, it does have useful and improved diatomaceous earth characteristics and comprises an improved feed for the production of high-grade diatomaceous earth products by modified calcination techniques. This beneficiated diatomite fraction can, of course, be employed for secondary uses as heretofore indicated.

In illustrative Example II, the process of the present invention results in the beneficiation of a low-grade material containing 10 percent clay to produce a beneficiated product containing 96 percent by weight diatomites and 4 percent clay. This beneficiated product, therefore, is the equivalent of high-grade diatomaceous earth deposits and may be subjected to a conventional calcination operation to produce high-grade diatomaceous earth filter-aid products. Again, a high diatomite recovery, on the order of 80 percent, is obtained.

In some instances, a raw diatomaceous earth material may contain, in addition to the ordinary quartz constituent, an additional quantity of quartz in the form of silt. This silt comprises fine grain material having a particle size distribution generally of from about 30 to 40 microns. When the raw material contains a significant amount of such quartz silt, a further embodiment of the present invention may be employed with advantage. This embodiment is illustrated in FIG. 3. In this illustrative embodiment, a raw diatomaceous earth material having 30 percent by weight diatomites, 40 percent quartz, including 4 percent silt, and a clay content of 30 percent. Following the initial attritioning and dispersing operation, the slurry of raw material is centrifugally classified into a +2 micron fraction and a −2 micron fraction. The overflow, or −2 micron fraction, contains the major portion of clay together with a small amount of diatomites. As above, the separation is based upon an efficiency of 90 percent. The underflow, or +2 micron fraction, may be mixed with an additional amount of clay dispersant, if desired, and passed to a cyclone desanding operation to effect a 325 mesh "cut." The underflow from this operation, i.e. the +325 mesh fraction, comprises essentially quartz together with a small amount of diatomite. The silt quartz, however, remains in the overflow, i.e. the −325 mesh fraction. This fraction also contains the bulk of the diatomite constituents and the clay particles that were not separated in the clay removal operation. This overflow is then passed to a well known flotation cell for removal of the silt from the material being treated. In the quartz flotation cell, the material being treated is mixed with a cationic flotation reagent to float from the −325 mesh fraction being treated a substantial portion of the silt together with a large portion of the remaining clay particles. The underflow from the quartz flotation cell contains a relatively high proportion of the diatomite content of the raw material in the form of a beneficiated diatomite fraction. The thus beneficiated diatomite fraction, containing 95.6 percent by weight diatomite, comprises an improved feed for the production of high-grade diatomaceous earth filter-aid products.

The quartz flotation operation may be carried out in accordance with conventional quartz flotation technology well known in the art. Conventional cationic flotation reagents may be employed. Such agents selectively coat at least a portion of the surfaces of the quartz particles so as to produce a quartz tail, which can be recovered as a froth product. This froth product may be sent to waste.

Commonly employed cationic flotation reagents are aliphatic amine acetates, such as "Armene," produced by Armour & Co. While the amount of cationic flotation reagent employed is not critical, the reagent will commonly be employed in an amount within the range of from about 0.1 to 0.3 pounds per ton of solids in the slurry being treated. The flotation reagent is commonly modified by the presence of kerosene in amounts typically within the range of from about 0.25 to about 0.50 pounds per ton of solids being treated. The pH of the slurry is usually adjusted to about 7—7.2 by the addition of sodium hydroxide.

In another embodiment of this aspect of the invention, the −325 mesh fraction may be subjected to an elutriation operation in place of the quartz flotation operation referred to above. For this purpose, a standard commercial elutriator, such as a Dorr-Oliver "Hydrosizer" may be employed. By means of this operation, a slurry of solids comprising principally the diatomite content of the treated material is obtained, the silt content thereof having been separated therefrom in the elutriator.

If desired in order to facilitate the handling of the concentrated slurry following cyclone desanding, water may be added to the concentrated solids in a repulping tank prior to elutriation. The solids concentration of the slurry may, for example, be reduced to about 20 percent by weight in the repulping tank. Following elutriation, the solids concentration will, in this case, be generally on the order of 10—15 percent by weight.

In each embodiment described above, a beneficiated diatomite fraction is obtained that may be employed as an improved feed in known techniques for the production of filter-aid material. Conventionally, the diatomaceous earth feed for the production of filter-aid material is subjected to drying and calcination operations. Calcination is commonly carried out at a temperature of from about 700° C. to about 1,300° C. for a period of time of from about 10 minutes to about 30—45 minutes.

It is generally desirable to concentrate the beneficiated fraction prior to drying in order to reduce the load on the dryer. This may be accomplished conveniently by filtration, as in a vacuum filter. In order to ease the load on the filter, a preliminary thickening operation may be performed prior to filtration. This operation may be carried out in a standard-type settling tank.

In the embodiment in which the slurry of solids is subjected to elutriation for silt removal, the solids concentration following elutriation is commonly about 10—15 percent, and the concentration of solids in the thickened slurry will commonly be on the order of 30—40 percent by weight. The solids concentration of the slurry leaving the quartz flotation cell, on the other hand, will commonly be on the order of about 35 percent by weight. This slurry may, of course, also be subjected to a thickening operation to relieve the load on the filters employed to concentrate the beneficiated fraction prior to the conventional calcination operation. In the embodiment shown in FIG. 1, the beneficiated diatomite fraction will typically have a solids concentration of about 40—50 percent by weight. In this embodiment, therefore, a preliminary thickening operation prior to filtration. The concentration of solids in the wet cake withdrawn from the filter will typically have a solids concentration on the order of 65—70 percent by weight. The water content of the dried material leaving the dryer preceding calcination is commonly on the order of about 20 percent by weight.

It will be appreciated that the water and solids content of the beneficiated fraction obtained as set forth in the various embodiments of the invention is not a critical feature of the invention but may be varied within ordinary limits. Likewise, the concentration of the slurry, as in the filtering step and in the preliminary thickening step if employed, are not critical features of the invention. The concentrations given are for illustrative purposes to indicate the desired concentration of the slurry to reduce the load on the dryer in the conventional drying-calcining operation.

In some instances, the material being treated may contain organic matter that tends to color the material to an offcolor brown instead of white. When it is desired to bleach the material to produce a white product, it is convenient to add a conventional bleaching agent, e.g. sodium hypochlorite, to the thickened slurry in a separate mixing tank prior to filtration.

As indicated above, the beneficiated fraction may be passed through a thickening tank to produce a more concentrated slurry prior to filtration. The thickening operation may be facilitated by the addition of a conventional flocculating agent to the slurry being thickened. While the amount of flocculating agent thus added is not a critical feature of the invention, such flocculants are ordinarily employed in amounts within the range of from about 0.2 to 0.5 pounds per ton of solids being treated. The flocculating agents employed for this purpose are generally long chain, high molecular weight, natural or synthetic polymers characterized by an inert carbon or silicon having attached thereto a large number of water-compatible groups such as hydroxyl, amine, amide or carboxyl groups. Compounds of this class include polyacrylamides, polysaccharides and the like. Flocculating agents of this type may be either anionic, cationic or nonionic. Examples of commercially available flocculating agents are the polyacrylamide polymers of Dow Chemical, such as Separan NP-10, NP-20, Separan C-90, and Separan MGL; the polyacrylamide aerofloc products of American Cyanamid, such as Aerofloc 550, Aerofloc 3425 and Aerofloc 3453; American Cyanamid's Superfloc 16 and 20, both polyacrylamides, and the Starfloc M-11 nonionic, polyacrylamide-type polymer marketed by Morningstar Products.

The present invention, therefore, represents a novel and significant means for beneficiating low-grade diatomaceous earth deposits. A high proportion of the diatomite content of the raw material may be recovered in the beneficiated diatomite fraction. The thus beneficiated fraction may be employed as an improved feed for the production of high-grade filter-aid material. The present invention thereby permits the use of low-grade deposits conventionally discarded or rejected. The present invention also enables the processing of low-grade deposits so as to avoid the necessity for employing costly selective mining techniques. The present invention, by providing for the beneficiating of low-grade deposits to an equivalent condition as high-grade deposits, further permits the use of extensive deposits of low-grade raw diatomaceous earth deposits existing near the areas of greatest filter-aid application. The use of such deposits has heretofore been precluded by the lack of a beneficiation process such as that provided by the present invention.

While the invention has been described herein with reference to particular embodiments thereof, it will be appreciated by those skilled in the art that various changes and modifications can be made therein without departing from the scope of the invention as set forth in the appended claims.

I claim:

1. A method of beneficiating raw diatomaceous earth containing appreciable quantities of clay which comprises:
   a. wet attritioning the raw diatomaceous earth to reduce the diatomite particle size to from about 5 to about 44 microns;
   b. hydraulically centrifugally classifying the product of step (a) to a +325 mesh fraction and a −325 mesh fraction and discarding the +325 mesh fraction;
   c. mixing the −325 mesh fraction with a clay dispersant to disperse clay particles; and
   d. centrifugally classifying the mixture obtained in step (c) into a +2 and a −2 micron fraction and recovering the +2 micron fraction characterized by a high diatomite content.

2. A method according to claim 1 in which the amount of clay dispersant employed is within the range of from about 1 to about 14 pounds of dispersant per ton of raw diatomaceous earth material being treated.

3. A method according to claim 1 in which the clay dispersant is employed in an amount in the range of from about 2 to about 4 pounds of dispersant per ton of raw diatomaceous earth material being treated.

4. A method according to claim 1 in which the wet attritioning is conducted in presence of from about 0.25 to about 3.5 pounds of clay dispersant per ton of raw diatomaceous earth being treated.

5. A method according to claim 1 in which said hydraulic classification comprises a two-stage hydrocyclone classification.

6. A method according to claim 1 in which the clay content of the raw diatomaceous earth being treated is in the range of from about 5 percent to about 10 percent by weight and the +2 micron fraction recovered is calcined.

7. A method of beneficiating diatomaceous earth containing appreciable quantities of clay and silt containing quartz which comprises:
   a. wet attritioning the raw diatomaceous earth in the presence of a clay dispersant to reduce the diatomite particle size to from about 5 to about 40 microns;
   b. removing clay by centrifugally classifying the product of step (a) into a +2 and a −2 micron fraction, discarding the −2 micron fraction which is rich in clay and recovering the +2 micron fraction;
   c. hydraulically centrifugally classifying said +2 micron fraction into a +325 and a −325 mesh fraction and recovering the −325 mesh fraction; and
   d. treating the −325 mesh fraction to further remove impurities and recovering the beneficiated diatomaceous earth product.

8. A method according to claim 7 in which the amount of clay dispersant employed is from about 1 to about 14 pounds per ton of raw diatomaceous earth solid material being treated.

9. A method according to claim 7 in which the amount of clay dispersant employed is from about 2 to about 4 pounds per ton of raw diatomaceous earth solid material being treated.

10. A method according to claim 7 in which the −325 mesh fraction treated in step (d) is elutriated to separate silt from the diatomite particles, the underflow from the elutriation operation being discarded, the overflow therefrom comprising a dilute slurry of diatomite particles, which is recovered.

11. A method according to claim 7 in which the −325 mesh fraction which is treated is subjected to a froth flotation operation with a cationic reagent to float silt and clay particles from said fraction, the −325 mesh underflow containing the diatomite fraction being recovered.

12. A method according to claim 11 in which the −325 mesh underflow fraction is thickened and filtered to produce a concentrated filter cake, containing from about 60 to about 70 percent by weight solids.

13. A method according to claim 12 in which a flocculant is employed in an amount of from about 0.2 to about 0.5 pounds of flocculant per ton of solids in said −325 mesh underflow slurry to facilitate settling of the solids in said thickening operation.

14. A method according to claim 12 in which the −325 mesh underflow fraction is bleached prior to filtration.